Figure 1:
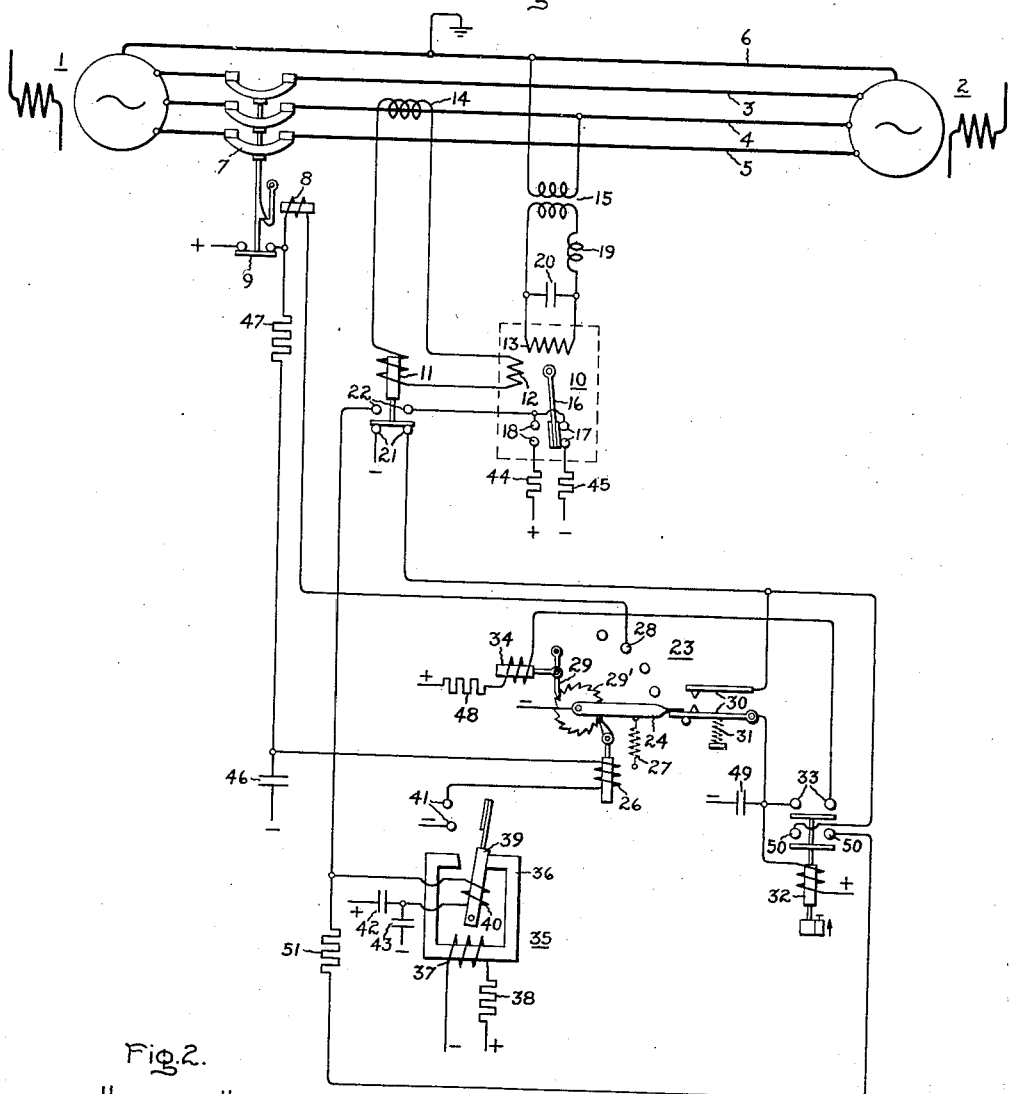

Aug. 15, 1939.     H. T. SEELEY     2,169,853
SUPERVISION OF ELECTRIC SYSTEMS
Filed Oct. 29, 1937

Inventor:
Harold T. Seeley,
by Harry E. Dunham
His Attorney.

Patented Aug. 15, 1939

2,169,853

UNITED STATES PATENT OFFICE 2,169,853

SUPERVISION OF ELECTRIC SYSTEMS

Harold T. Seeley, Lansdowne, Pa., assignor to General Electric Company, a corporation of New York Application October 29, 1937, Serial No. 171,694

14 Claims. (Cl. 175—294)

My invention relates to improvements in the supervision of alternating-current electric systems and more particularly to improvements in arrangements such as are disclosed in United States Letters Patent 2,095,117 issued October 5, 1937, to the assignee of this invention. An object of my invention is to provide improved means for discriminating between faults and out-of-step conditions whereby to detect asynchronous conditions of alternating-current systems particularly at high slip frequency and to eliminate such conditions in the shortest possible time. This, and other objects of my invention, will appear in more detail hereinafter.

Faults on an alternating-current electric system have been known to cause synchronous machinery to fall out-of-step and thereby to produce such unstable voltage and current conditions in sound portions of the system as to cause false operation of the fault responsive protective relays and the circuit breakers controlled thereby on the sound portions. Obviously, such false operation must be avoided because loads are likely to be left without any source of power. It is therefore desirable, on the occurrence of out-of-step conditions, to subdivide the system, or to disconnect synchronous dynamo-electric machines or remove the field therefrom in such a way as to eliminate the out-of-step condition, but no load is to be left without a source of power. For subdividing the system, points may be chosen at which there is no exchange of power.

In the Letters Patent previously mentioned, there is disclosed an asynchronous condition responsive means which functions on the basis that, during asynchronous conditions, power reversals occur when the current is at its maximum value and also that with purely fault conditions, there will not be more than two power reversals whereas with asynchronous conditions, power reversals will continue indefinitely until synchronism is restored or the circuit is opened. In other words, if three power reversals, accompanied by abnormal current conditions occur within a predetermined time, this is a definite indication of asynchronism as distinguished from faults and swings. In the carrying out of my invention, I make use of this feature.

In case of out-of-step operation due to slip purely on overload, the slip frequency starts from zero. However, slip from this cause can generally be avoided by proper load dispatching. Most cases of slip result from short circuits which reduce or possibly completely eliminate the synchronizing power flowing between the two ends of the system. In case of a three-phase short circuit on a single transmission line, connecting, for example, a motor and a generator, both machines feed power into the short circuit until they stall or until the short circuit is cleared. If the load on the motor is maintained and the short circuit is not cleared promptly, the slip frequency at the instant the short circuit is cleared may be large because of the decrease in motor speed and motor frequency which occurred during the short circuit. There is thus a wide range in slip frequency to be met in order to take care of the different out-of-step possibilities. In accordance with my invention, I provide an improved out-of-step responsive means which operates satisfactorily not only at low values of slip frequency but also at high values even as great as 50% of the rated frequency of the system.

My invention will be better understood from the following description when considered in connection with the accompanying drawing, and its scope will be pointed out in the appended claims.

Figure 2:
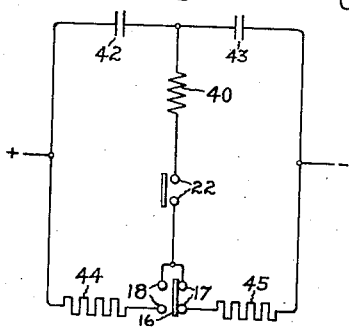

In the accompanying drawing, Fig. 1 illustrates diagrammatically an embodiment of my invention in a polyphase alternating current electric system; and Fig. 2 is a schematic or elementary diagram of a part of the embodiment of my invention shown in Fig. 1.

In Fig. 1 I have illustrated my invention as embodied in a polyphase alternating-current electric system shown schematically and simply as comprising two synchronous dynamo-electric machines 1 and 2 which are interconnected by phase conductors 3, 4 and 5. A fourth conductor 6, such as a neutral or ground wire, or any other suitable means, may be provided when it is desired to obtain line-to-ground potential for operation. The balance of the system network and apparatus if any, such as feeders, transformers and other devices, has been omitted for the sake of simplicity in illustration. For subdividing the system, for example, to disconnect one of the machines from the other on the occurrence of asynchronous conditions, there may be provided suitable means illustrated as a latched closed circuit breaker 7. As shown, this circuit breaker is provided with a trip coil 8 and an auxiliary switch 9 which is closed when the circuit breaker is closed and open when the circuit breaker is open.

When the machines 1 and 2 become asynchronous, the power transfer between these machines over the line 3, 4, 5 reverses twice for each electrical revolution of one machine relatively to the other. Since the system impedance is mostly inductance, one of these reversals is at the instant of maximum current flow when the electromotive forces of the machines are displaced substantially 180° in phase relation, and the other is at the time of minimum current flow when the electromotive forces are substantially in phase. The latter reversal may also occur during oscillations of the type which become damped more or less quickly without producing out-of-step conditions. The actual phase displacement angles at which these reversals occur may differ somewhat from zero degrees and 180°, depending on the natural angle of the system; that is, $$\tan^{-1}\frac{X}{R}$$

where X is the total reactance and R the total resistance from end to end, including the machines.

In accordance with my invention, I provide high-speed detecting means which functions on the basis of the reversal of power under the maximum current conditions. To this end I provide a high-speed power directional relay 10 and means such as one or more relays 11 connected to be energized responsively to current conditions of the system. The power directional relay 10 is shown merely for purposes of illustration as of the single-phase wattmetric type having current and voltage windings 12 and 13 respectively. The current winding 12 is connected to be energized from a current transformer 14 in the phase conductor 4, and the potential winding 13 is connected to be energized from a potential transformer 15 connected between the phase conductor 4 and the neutral wire or ground 6. As shown, the power directional relay 10 is of the double-throw type embodying a contact controlling member 16 movable between contacts 17 and 18. In order to obtain high-speed operation in accordance with my invention, the movement of the contact-controlling member 16 from one contact-controlling position to another in response to a change in the direction of flow of the power may be, for example, in the neighborhood of 0.01 inch. The torque characteristic of the power directional relay may be $$T = EI \cos\left(\theta - \cot^{-1}\frac{X}{R}\right)$$

where refinement is desired, but for most practical applications a power directional relay having a torque $T = EI \cos \theta$ should be satisfactory. In order to obtain the desired phase displacement between the current in and the potential across the potential winding 13, suitable phase-displacing means, such as a reactor 19 and a condenser 20, may be provided whereby to insure maximum torque at a desired system power factor. The current responsive relay 11 may be a simple high-speed overcurrent relay as illustrated, but in order to obtain a response which is independent of line-load conditions, this relay may be of the so-called impedance-responsive or distance type, examples of which are well known to the art. The relay 11 has a set of normally closed contacts 21 and a set of normally open contacts 22, the arrangement being such that the contacts 21 are closed until the current in the phase conductor 4 exceeds the predetermined value to which the relay responds quickly to open its contacts 21 and close its contacts 22.

When a fault involving, for example, phase conductor occurs, the abnormal current condition relay 11 will operate and the power directional relay 10 will or will not open its contacts 17 and close its contacts 18 depending upon whether or not the fault is so located as to cause a change in the direction of flow of power. If the power flow were reversed by the fault, then when the fault is cleared, a return to the original direction of power flow occurs. Thus, assuming normal direction of power flow is from dynamo-electric machine 1, which may be a source to dynamo-electric machine 2, which may drive a load, the contact-controlling member 16 of the power directional relay 10 may stand still, with its contacts 17 closed, or move to the left and then to the right. If the abnormal current condition detecting relay 11 has its contacts 22 closed, as during the fault or after the fault because of swings, there would result no discrimination between faults and out-of-step conditions. Subsequent oscillations, causing power reversals, would not result in the closing of the circuit through the contacts of the abnormal current condition relay 10 and the contacts 18 of the power directional relay because at the time the power directional relay closes its contacts 18, the current will be at a minimum and the contacts 22 of the current dependent relay 11 will be open. In other words, the abnormal current condition relay and the power directional relay alone provide discrimination between a fault or an out-of-step condition and an oscillating condition, but they do not provide the desired discrimination between a fault and an out-of-step condition.

In order to obtain this discrimination, I provide, under the joint control of the abnormal condition relay 11 and the power directional relay 10, a cumulative action means illustrated as a notching relay 23. As shown, this relay is arranged, through a movable controlling member 24, to control the circuit of the trip coil 8, if it is desired to trip the circuit breaker 7 on the occurrence of an asynchronous condition. The relay 23 is effective only after a predetermined number of actions to complete the circuit of the tip coil. In other words, the operation of the relay 23 is such that when its winding 26 is energized a predetermined number of times, the controlling member 24 is turned counterclockwise against the bias of suitable means such as a spring 27 far enough to close a contact 28 in the circuit of the trip coil 8. The return of the member 24 under the bias of the spring 27 between the successive energizations of the winding 26 is prevented by a pawl 29 which engages a ratchet 29' movable with the controlling member 24. On the first impulse of the controlling member 24, auxiliary contacts 30, which are normally held open by this member, are released to close under the bias of suitable means such as a spring 31. Upon closing, they complete the circuit of the delay device 32 which, through its contacts 33, controls the circuit of the holding pawl releasing magnet 34. If the control member 24 is moved to engage its contact 28 before the expiration of the time action of the time delay relay 32, as will be the case when a sustained asynchronous conditions occurs, then the circuit of the trip coil is completed through the circuit breaker auxiliary switch 9 which is closed when the circuit breaker is closed and opened when the circuit breaker opens.

In order to utilize to the best advantage the high-speed operation of the power directional relay 10, i. e., to be certain of the desired action at high slip frequencies, I provide in accordance with my invention, for the purpose of controlling the cumulative action device 23, a high speed directionally responsive auxiliary relay device 35. This is illustrated as a direct current type polarized relay, examples of which are well known to the electrical art and especially the telephone art. As shown, the relay 35 comprises a magnetic core 36 provided with a polarizing winding 37 whose circuit may contain a current limiting means such as a resistor 38. The relay 36 further includes a pivoted armature 39 which is provided with an operating winding 40 and is arranged to control contacts 41 in the circuit of the operating winding 26 of the cumulative action relay 23. As long as the connection of the polarizing winding 37 is unchanged, the direction of movement of the armature 39 is, of course, dependent upon the direction of flow of current in the operating winding 40. The direction of flow of current in the operating winding 40 is in turn dependent on the position of the contact controlling member 16 of the power directional relay 10. The auxiliary relay 35 may be of the type in which, under the influence of the polarizing winding, the armature remains in the last position to which it is operated upon subsequent deenergization of the operating winding.

In order to secure the utmost advantage of the high operating speed of the relay 35, the operating winding 40 may be connected in a capacitor bridge circuit in series with the contacts 22 of the current responsive relay 11 and the contacts 17 or 18 of the power directional relay 10. As shown, the bridge circuit includes the condensers 42 and 43. In order to prevent a short circuit of the direct current control source in case both contacts of the power directional relay 10 were to become closed simultaneously by accident and also to prevent oscillation of the condensers 42 or 43 with the operating winding 40 of the polarized relay 35 such that closure of the contacts 41 in a single direction from the off position would cause both operation and resetting of the polarized relay, the bridge circuit includes the current limiting and damping resistors 44 and 45. The connection and arrangement of the parts involved in the bridge circuit will be more clearly obvious from the elementary diagram shown in Fig. 2.

In order to insure operation of the cumulative action relay 23 at high slip frequencies, i. e., to be certain that for a minimum voltage this relay always operates whenever the polarized relay 35 operates, I connect in parallel with the operating winding 26 of the relay 23 a condenser 46 whereby the full voltage of the control source is normally impressed on one terminal of the operating winding and I further connect in series with this winding a current limiting means such as a resistor 47, which serves, when the circuit of the winding is completed, to limit the current to the continuous rating of the winding. With this arrangement, the condenser 46 acts as a reservoir to provide an impulse discharge and thereby to obtain the maximum effect for a minimum control voltage in order to insure a positive notching operation of the device whenever the relay 35 closes its contacts 41.

Assuming that the parts are positioned as shown in the drawing and that the line 3, 4, 5 becomes asynchronous for any reason, such as overloading of one of the dynamo-electric machines shown or because of conditions arising from faults, then the current responsive relay 11 will operate to open its contacts 21 and to close its contacts 22 and the circuit controlling member 16 of the power directional relay 10 will oscillate between its contacts 17 and 18 at a frequency dependent upon the slip frequency of the line. When the contacts 22 and 18 are closed, the condenser 42 is discharged and the condenser 43 is charged both by currents in the same direction through the operating winding 40 of the directional relay 35 and in a direction to effect the movement of the armature 39 to close the contacts 41. This completes the circuit of the operating winding 26 whereby the condenser 46 is discharged through this winding to boost the energization of the winding. On the first energization of the operating winding 26, the controlling member 24 is moved up one notch against the bias of the spring 27 and held by the pawl 29 and the ratchet 29'. At the same time the contacts 30 in the circuit of the timing relay 32 are closed under the bias of the spring 31, but this relay is not energized until the current responsive relay 11 drops out during the low current condition of the slip cycle. When the power reverses so that the power directional relay closes its contacts 17 while the current relay contacts 22 are closed, the condenser 43 is discharged and the condenser 42 charged both by currents in the same direction through the operating winding 40 of the directional relay 35 and in a direction to move the contact controlling member 39 to the circuit opening position shown in the drawing. The operating winding 26 of the cumulative action relay 23 is thereby deenergized to permit the return of the notching element.

Subsequent reversals of the power directional relay, if repeated within the time action of the timing relay 32, result in further notching action of the controlling member 24 until it reaches the contact 28 to complete the circuit of the trip coil 8 and thereby effect the opening of the circuit breaker. When this occurs, the opening of the circuit breaker auxiliary switch 9 interrupts the circuit of the trip coil 8 and also the circuit of the operating winding 26 of the cumulative action device 23 so that the controlling member 24 is free to return to its initial position, as shown, as soon as the releasing magnet 34 is energized. This will occur with the closing of the contacts 21 a predetermined time after they complete the circuit of the timing relay 32 since this relay closes its contacts 33 to complete the circuit of the releasing magnet 34 from the negative side of the control source through the contacts 21 of the current responsive relay 11 thence through the contacts 30 of the cumulative action device 23, the contacts 33 of the timing relay 32, the winding of the releasing magnet 34, and the current limiting means 48, when necessary, to the positive side of the control source. For arc quenching purposes to relieve the contacts 30 and 21, a condenser 49 may be connected in circuit with these contacts, as shown. When the current responsive relay 11 drops out to close its contacts 21 while the timing relay 32 is energized to close its contacts 50, a circuit is completed through the operating winding 40 of the auxiliary directional relay 35 by way of the charged condenser 42 and a resistor 51 to provide an impulse discharge whereby to return the armature 39 of the relay 35 to the circuit opening position shown in the drawing so that the various elements of the arrangement are reset for the next out-of-step operation.

In connection with the foregoing description of the operation of the illustrated embodiment of my invention, it will be observed that if the original direction of power flow were such as to maintain the contact controlling member 16 to the right with the contacts 17 closed, then on the first reversal to the left to close contacts 18, the cumulative action device will be actuated once to move one notch. On the next reversal to the right to close contacts 17, the actuating winding 26 will be deenergized, and on the next reversal of power flow to close contacts 18, the winding 26 will be energized again for the second notching movement. If the original position of the contact controlling member 16 is to the left with the contacts 18 closed and the abnormal current condition occurs with power flow in the same direction as the previously existing load power flow, then the cumulative action device will be actuated once, and on the next reversal of power flow, the operating winding 26 will be denergized and on the next following reversal reenergized to effect the second notching. In this case, where the direction of flow of abnormal current is the same as the existing direction of load power flow, two reversals of power are sufficient to detect an asynchronous condition because only one reversal would follow the interruption of the fault condition if this were the cause of the asynchronous condition. If the contact controlling member 16 were originally on the left, closing contacts 18, and an abnormal current condition occurs with a reversal of power flow, the power directional relay would immediately move to the right to close contacts 17 and then to the left on reversal to actuate the cumulative action device once. Resetting would follow on the movement of the contact controlling member 16 to the right to close contacts 17 and on the next movement to the left, the cumulative action device would be actuated a second time.

However, inasmuch as an abnormal current condition may continue for several minutes or even a few hours under emergency conditions and may be accompanied by power flow in the abnormal direction, as in the case of a frequency converter interconnecting two systems, dependence on two notching movements might prove unreliable. For example, under the conditions just stated, the contacts 18, 22 and 41 would all be closed with the contact controlling member 24 on the first notch. Consequently, if a short circuit should occur between the relay instrument transformers and the machine that was acting as a source during emergency operation, there would be a reversal of power and when the short circuit was cleared, as by a feeder breaker, the power flow would resume its previous direction. This would move the circuit controlling member 24 to the second notch and cause false tripping of the circuit breaker when there was no asynchronous operation. If the setting of the overcurrent relay 11 were raised sufficiently to prevent such action, this relay might fail to pick up when the system was operating with a high impedance and out of synchronism as at a time of light load with few generators in operation. It is, therefore, generally desirable to have the circuit of the trip coil 8 controlled on the third notching movement at contact 28 as shown in the drawing.

If during the course of an initiated operation of the asynchronous condition responsive means shown, the current responsive relay 11 fails to receive more than one energizing impulse within the time setting of the timing element 32, the contacts 33 of this relay energize the resetting magnet 34 which is returned to its reset position. Also the operating winding 40 of the directional relay 35 is given an impulse discharge to return the armature 39 to the contact opening position. The timing relay 32 then resets itself so that the parts are ready for a subsequent operation.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination, an alternating current system, a device to be operated, and means for operating said device after a predetermined number of reversals of flow in system power during abnormal current conditions of the system including means responsive to each change in the direction of flow of system power, means responsive to predetermined abnormal current conditions of the system, cumulative action means for effecting the operation of said device after a predetermined number of actuations in a predetermined time, and means controlled by said power directional and current responsive means for effecting actuations of said cumulative action means incuding a directional relay device having a member operable from one position to another position to effect an actuation of said cumulative action means when said power directional responsive means operates in response to power flow in one direction during abnormal current conditions of the system and to be returned to said one position when said power directional responsive means operates in response to power flow in the opposite direction during abnormal current conditions of the system.

2. In combination, an alternating current system, a device to be operated, and means for operating said device after a predetermined number of reversals of flow in system power during abnormal current conditions of the system including means responsive to each change in the direction of flow of system power, means responsive to predetermined abnormal current conditions of the system, cumulative action means for effecting the operation of said device after a predetermined number of actuations in a predetermined time, and means controlled by said power directional and current responsive means for effecting actuations of said cumulative action means including a directional relay device having a member operable from one position to another position to effect an actuation of said cumulative action means when said power directional responsive means operates in response to power flow in one direction during abnormal current conditions of the system, and to be returned to said one position when said power directional responsive means operates in response to power flow in the opposite direction during abnormal current conditions of the system, and means for restoring said member to said one position on the cessation of abnormal current conditions independently of the direction of power flow.

3. In combination, an alternating current system, a device to be operated, and means for operating said device after a predetermined number of reversals of flow in system power during abnormal current conditions of the system including means responsive to each change in the direction of flow of system power, means responsive to predetermined abnormal current conditions of the system, cumulative action means for effecting the operation of said device after a predetermined number of actuations in a predetermined time, and means controlled by said power directional and current responsive means for effecting actuations of said cumulative action means including a directional relay device having a member operable from one position to another position to effect an actuation of said cumulative action means when said power directional responsive means operates in response to power flow in one direction during abnormal current conditions of the system, and to be returned to said one position when said power directional responsive means operates in response to power flow in the opposite direction during abnormal current conditions of the system, and means operative to restore said member to said one position upon the cessation of abnormal current conditions even though the power flow was in said one direction subsequent to said cessation including a time element relay connected to be controlled by said abnormal current condition means and said cumulative action means.

4. In combination, an alternating current system, circuit interrupting means for controlling said system and means for controlling said circuit interrupting means whereby to effect a circuit interrupting operation on the occurrence of asynchronous conditions of the system including a cumulative action means for effecting the circuit interrupting operation after a predetermined number of actuations in a predetermined time and means for controlling said cumulative action means including power directional and current responsive relays connected to be energized from the system and means controlled by said power directional and current responsive relays including a directional relay having a member movable from one position to another position to effect an actuation of said cumulative action means when said power directional responsive relay operates in response to power flow in one direction during a response of said current responsive relay and to be returned to said one position when said power directional relay operates in response to power flow in the opposite direction during a response of said current responsive relay.

5. In combination, an alternating current system, circuit interrupting means for controlling said system and means for controlling said circuit interrupting means whereby to effect a circuit interrupting operation on the occurrence of asynchronous conditions of the system including a cumulative action means for effecting the circuit interrupting operation after a predetermined number of actuations in a predetermined time and means for controlling said cumulative action means including power directional and current responsve relays connected to be energized from the system and means controlled by said power directional and current responsive relays including a directional relay having a member movable from one position to another to effect an actuation of said cumulative action means when said power directional responsive relay operates in response to power flow in one direction during a response of said current responsive relay and to be returned to said one position when said power directional relay operates in response to power flow in the opposite direction during a response of said current responsive relay, and means for restoring said member to said one position upon the cessation of abnormal current conditions independently of the direction of power flow at the time of the circuit interrupting operation.

6. In combination, an alternating current system, a device to be operated, means for operating said device upon the occurrence of asynchronous conditions including a cumulative action means for effecting the operation of said device after a predetermined number of actuations in a predetermined time, means for controlling said cumulative action means including a directional relay device having a member operable from one position to another position to effect an actuation of said cumulative action means, and system energized means for controlling said directional relay device to effect the operation of said member to said other position when the flow of system power is in one direction during abnormal current conditions and to return said member to said one position without actuating said cumulative action means when the flow of system power is in the opposite direction during abnormal current conditions of the system.

7. In combination, an alternating current system, a device to be operated, means for operating said device upon the occurrence of asynchronous conditions including a cumulative action means for effecting the operation of said device after a predetermined number of actuations in a predetermined time and means for controlling said cumulative action means including a directional relay device having a member operable from one position to another position to effect an actuation of said cumulative action means when the flow of circuit power is in one direction during abnormal current conditions and to be returned to said one position when the flow of circuit power is in the opposite direction during abnormal current conditions of the system and means for restoring said member to said one position upon the cessation of abnormal current conditions independently of the direction of power flow at the time said device was operated.

8. In combination, with an alternating current circuit, a relay device having an operating winding, means for controlling the energization of said winding including a bridge circuit comprising two condensers and two resistors connected in series in the order resistor, condenser, condenser, resistor, a direct current source connected across said condensers, and means responsive to the direction of flow of circuit power for connecting said winding between said condensers and to one or the other of said resistors.

9. In combination, an alternating current system, a device to be operated, means for operating said device after a predetermined number of reversals of flow in system power during abnormal current conditions of the system including a cumulative action means for effecting the operation of said device after a predetermined number of actuations in a predetermined time including a directional relay device having an operating winding, a bridge circuit for said winding including two condensers and two resistors connected in series in the order resistor, condenser, condenser, resistor, a direct current source connected across said condensers, and means for connecting said winding between said condensers and to one or the other of said resistors depending upon the direction of flow of circuit power.

10. In combination, a source of direct current, two condensers connected in series across said source, a relay having an operating winding, and switching means for selectively connecting said winding in parallel with either one of said condensers and in series with the other.

11. In combination, an alternating current circuit, a source of direct current, two condensers connected in series across said source, a relay having an operating winding and means controlled by the direction of power flow during predetermined abnormal conditions of said circuit for connecting said winding across one of said condensers in response to power flow in one direction during said abnormal circuit conditions and for connecting said winding across the other of said condensers in response to power flow in the opposite direction during said abnormal circuit conditions.

12. In combination, an alternating current circuit, a directional relay having an operating winding, means for energizing said winding including means responsive to a predetermined abnormal condition of said circuit while the power flow therein is in a predetermined direction for causing current to flow through said operating winding in a predetermined direction, and means responsive to said predetermined abnormal condition of said circuit while the power flow therein is in the opposite direction for causing current to flow in the reverse direction in said winding.

13. In combination, an alternating current circuit, a directional relay having an operating winding, means for energizing said winding including means responsive to a predetermined abnormal condition of said circuit while the power flow therein is in a predetermined direction for causing current to flow through said operating winding in a predetermined direction, means responsive to said predetermined abnormal condition of said circuit while the power flow therein is in the opposite direction for causing current to flow in the reverse direction in said winding, and means responsive to a predetermined number of actuations of said relay due to the current reversals in said operating winding.

14. In combination, an alternating current circuit, a direct current directional relay device having an operating winding, a bridge circuit including two condensers in series and two resistors respectively connected in series with said condensers, a direct current source connected across said series connected condensers, and means for connecting said winding between said condensers and to one or the other of said resistors depending upon the direction of flow of circuit power.

HAROLD T. SEELEY.